July 6, 1937.  G. H. STONER  2,085,834
VEHICLE BRAKE
Filed Jan. 28, 1936
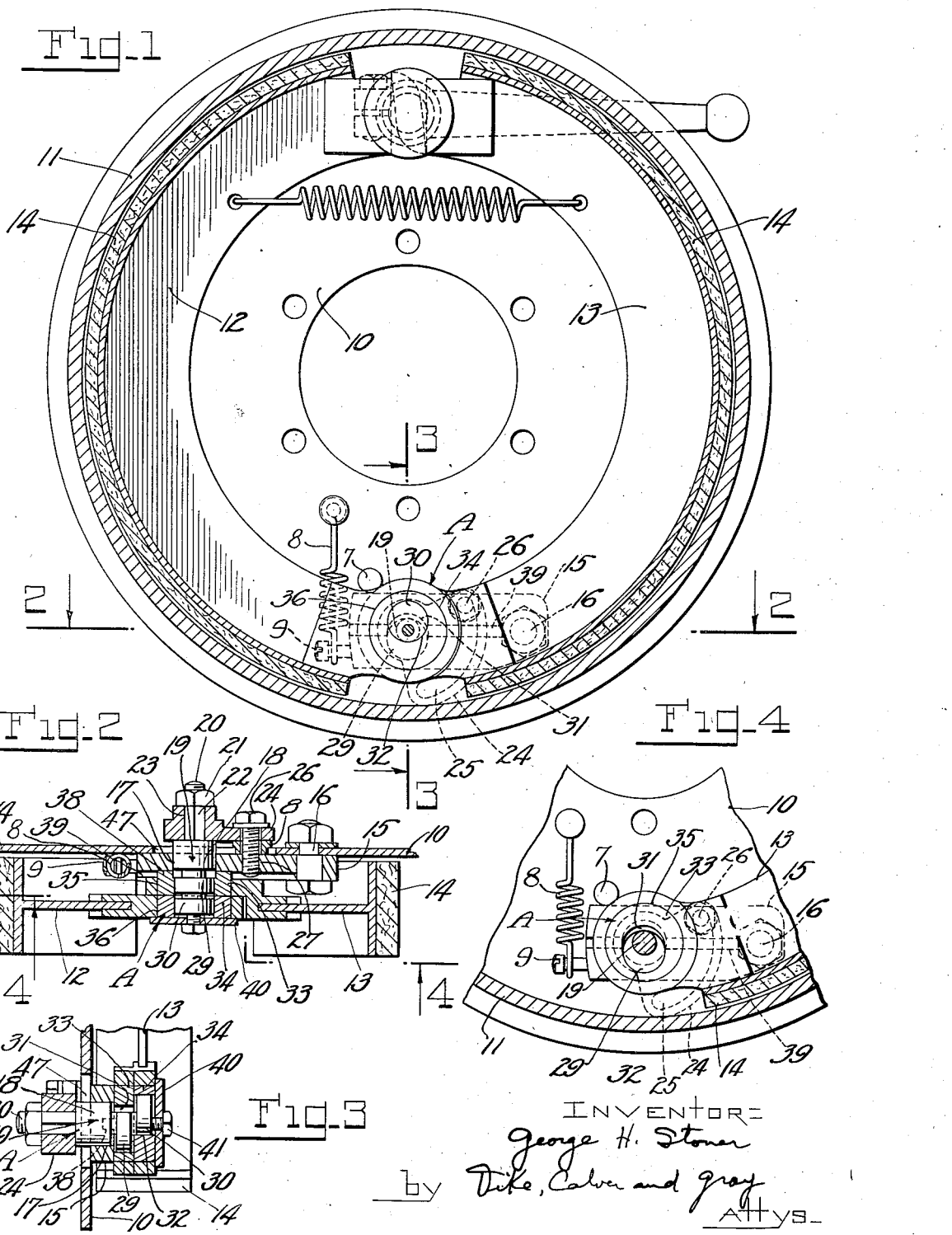

Patented July 6, 1937

2,085,834

UNITED STATES PATENT OFFICE 2,085,834

VEHICLE BRAKE

George H. Stoner, East Boston, Mass., assignor, by mesne assignments, to Tru-Arc, Inc., Boston, Mass., a corporation of Massachusetts Application January 28, 1936, Serial No. 61,147

8 Claims. (Cl. 188—79.5)

This invention relates to vehicle brakes of the internal expanding type and more specifically to brakes of this type in which the brake shoes are mounted upon an anchor which is movably carried by the backing plate.

It is an object of the invention to provide a simple arrangement whereby the brake shoes may be adjusted to provide the desired clearance between the same and the rotatable drum to compensate for wear of the brake lining. The invention is especially adapted for use in the type of vehicle brake in which the brake shoes are mounted upon an anchor which is movably carried by the backing plate.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention will be more clearly understood from the following description in conjunction with the accompanying drawing: in which, Fig. 1 is a sectional elevational view of a vehicle brake embodying the invention;

Fig. 2 is a sectional view taken upon the line 2—2 of Fig. 1;

Fig. 3 is a sectional view taken upon the line 3—3 of Fig. 1; and

Fig. 4 is a sectional view taken upon the line 4—4 of Fig. 2.

One embodiment of the invention is illustrated in the accompanying drawing and comprises a backing plate 10 adapted to be fixed to a stationary part of the vehicle and a rotatable drum 11 adapted to be mounted upon a vehicle wheel. A pair of brake shoes 12 and 13, each having a suitable brake lining 14 fixed upon its outer surface, are pivotally carried by an anchor assembly A which is movably carried by the backing plate 10.

The anchor assembly A comprises an arm 15 one end of which is pivotally mounted upon a stud 16 fixed to the backing plate 10. A spring 8, secured at one end to the backing plate 10 and at its other end to a stud 9 carried at the free end of the arm 15, tends to hold the arm 15 against a stop 7 fixed in the backing plate 10. The arm 15 is provided near its other end with a bearing surface 17 adapted to rotatably receive the intermediate portion 18 of a shaft 19. One end of the shaft 19 projects through a hole 47 of greater diameter in the backing plate and is provided with a threaded portion 20 adapted to receive a nut 21. Between the portions 18 and 20, the shaft 19 is provided with a portion 22 of square cross section adapted to engage the square hole 23 of a locking plate 24 having an arcuate slot 25. The locking plate 24 is secured to the arm 15 by a screw 26 passing through the slot 25 in said plate and the hole 47 in the backing plate and engaging a threaded hole 27 in the arm 15 to lock the shaft 19 upon the arm 15 and prevent relative movement therebetween. The screw 26 also passes through a washer 8 which is interposed between the plate 24 and the arm 15.

The other end of the shaft 19 is provided with a pair of eccentrics 29 and 30 adapted to be received in an elongated bearing hole 31 and a circular bearing hole 32 formed in bearing rings 33 and 34, respectively. The bearing rings 33 and 34 are provided with outer cylindrical surfaces adapted to engage the bearing surfaces 35 and 36 respectively of the brake shoes 13 and 12, the bearing surface 35 being positioned in the offset end of the brake shoe 13. The elongated bearing hole 31 has a width corresponding substantially to the diameter of the eccentric 29 and the bearing hole 32 has a diameter corresponding substantially to the diameter of the eccentric 30. The bearing surfaces 35 and 36 are formed to provide a positive connection between the brake shoes 12 and 18 and the bearing rings 33 and 34 whereby the brake shoes may move toward and away from the drum 11 with the bearing rings. The bearing ring 33 is provided with a key 38 slidably engaging a groove 39 in the arm 15. The adjacent ends of the brake shoes 12 and 13 are held between the arm 15 and a cap plate 40 secured to the shaft 19 by a screw 41.

When the brake linings 14 have become worn so that it is desirable to adjust the brake shoes 12 and 13 to provide the desired clearance between the brake linings 14 and the drum 11, the screw 26 is loosened to unlock the plate 24 so as to permit the latter and the shaft 19 to be rotated. As the shaft 19 is rotated the eccentric 29 moves along the elongated bearing hole 31 and causes the bearing ring 33 and the brake shoe 13 to be slidably guided outwardly toward the drum 11 by the engagement of the key 38 with the slot 39, thereby moving the brake shoe 13 closer to the inner surface of the drum. At the same time, as the shaft 19 is rotated, the bearing ring 34 is moved outwardly toward the drum 11 by the eccentric 30 carrying with it the brake shoe 12 so as to provide the desired clearance between the latter and the drum 11. The screw 26 is then tightened to lock the plate 24 and the shaft 19 on the arm 15.

This application is directed to a specific embodiment of the invention described and claimed broadly in applicant's co-pending application Serial No. 5410, filed February 7, 1935.

I claim:

1. In a vehicle brake, in combination, a rotatable brake drum, a backing plate, a pair of brake shoes, and anchor means for said shoes carried by said backing plate, said means comprising a rotatable shaft, eccentrics carried by said shaft, bearings engaging said eccentrics adapted to be rotatably engaged by adjacent ends of said shoes, one of said bearings being a bearing ring having an elongated bearing hole for receiving one of said eccentrics and being slidably mounted to permit it to move toward and away from the drum, and means for locking said shaft to said anchor means.

2. In a vehicle brake, in combination, a rotatable brake drum, a backing plate, a pair of brake shoes, and anchor means for said shoes carried by said backing plate, said means comprising a rotatable shaft, eccentrics carried by said shaft, bearing rings surrounding said eccentrics adapted to be rotatably engaged by adjacent ends of said shoes, one of said bearing rings having an elongated bearing hole for receiving one of said eccentrics and being slidably mounted to permit it to move toward and away from the drum, and means for locking said shaft to said anchor means.

3. In a vehicle brake, in combination, a backing plate, an arm having one end pivotally mounted on the backing plate, a pair of brake shoes, and means carried by said arm for supporting said shoes, said means comprising a rotatable shaft, eccentrics carried by said shaft, bearings engaging said eccentrics adapted to be rotatably engaged by adjacent ends of said shoes, one of said bearings being a bearing ring having an elongated bearing hole for receiving one of said eccentrics and being slidably mounted to permit it to move toward and away from the drum, and means for locking said shaft on said arm.

4. In a vehicle brake, in combination, a backing plate, an arm having one end pivotally mounted on the backing plate, a pair of brake shoes, and means carried by said arm for supporting said shoes, said means comprising a rotatable shaft, eccentrics carried by said shaft, bearing rings surrounding said eccentrics adapted to be rotatably engaged by adjacent ends of said shoes, one of said bearings having an elongated bearing hole for receiving one of said eccentrics and being slidably mounted to permit its movement toward and away from the drum, and means for locking said shaft on said arm.

5. In a vehicle brake, in combination, a rotatable brake drum, a backing plate, a pair of brake shoes, and anchor means for said shoes carried by said backing plate, said means comprising a rotatable shaft, a pair of eccentrics carried by said shaft, a bearing ring surrounding one of said eccentrics and adapted to be rotatably engaged by the end portion of one of said shoes, the end portion of the other shoe having a bearing provided with an elongated bearing hole to receive the other eccentric, means for slidably mounting said end portion of said other shoe to permit its movement toward and away from the drum, and means for locking said shaft to said anchor means.

6. In a vehicle brake, in combination, a backing plate, an arm having one end pivotally mounted on the backing plate, a pair of brake shoes, and means carried by said arm for supporting said shoes, said means comprising a rotatable shaft, a pair of eccentrics carried by said shaft, a bearing ring surrounding one of said eccentrics and adapted to be rotatably engaged by the end portion of one of said shoes, the end portion of the other shoe having a bearing provided with an elongated bearing hole to receive the other eccentric, means for slidably mounting said end portion of said other shoe to permit its movement toward and away from the drum, and means for locking said shaft on said arm.

7. In a vehicle brake, in combination, a backing plate, an arm having one end pivotally mounted on the backing plate, a pair of brake shoes, and means carried by said arm for supporting said shoes, said means comprising a shaft rotatably mounted in said arm, eccentrics carried by said shaft, bearings surrounding said eccentrics adapted to be rotatably engaged by adjacent ends of said shoes, and means for locking said shaft on said arm.

8. In a vehicle brake, in combination, a rotatable brake drum, a backing plate, a pair of brake shoes, and anchor means for said shoes carried by said backing plate, said means comprising a rotatable shaft, eccentrics carried by said shaft, bearings surrounding said eccentrics adapted to be rotatably engaged by adjacent ends of said shoes, and means for locking said shaft to said anchor means.

GEORGE H. STONER.